(12) United States Patent
Gershfang et al.

(10) Patent No.: US 10,248,932 B2
(45) Date of Patent: Apr. 2, 2019

(54) INFORMING USERS OF A VIRTUAL UNIVERSE OF REAL WORLD EVENTS

(75) Inventors: Igor Y. Gershfang, Chicago, IL (US); Rick A. Hamilton, II, Charlottesville, VA (US); Neil A. Katz, Parkland, FL (US); James W. Seaman, Falls Church, VA (US); Adam R. Snopek, Chicago, IL (US); Richard Young, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 704 days.

(21) Appl. No.: 12/628,720

(22) Filed: Dec. 1, 2009

(65) Prior Publication Data

US 2011/0131508 A1 Jun. 2, 2011

(51) Int. Cl.
*G06F 3/0481* (2013.01)
*G06Q 10/10* (2012.01)
*G06F 3/0489* (2013.01)

(52) U.S. Cl.
CPC ........... *G06Q 10/10* (2013.01); *G06F 3/0481* (2013.01); *G06F 3/04895* (2013.01)

(58) Field of Classification Search
CPC ........... G06F 3/00; G06F 3/048; G06F 15/177
USPC .................................................. 715/706, 710
See application file for complete search history.

(56) References Cited

U.S. PATENT DOCUMENTS

| | | | |
|---|---|---|---|
| 6,065,138 A * | 5/2000 | Gould | G06F 3/011 702/176 |
| 7,301,450 B2 | 11/2007 | Carrino | |
| 7,453,990 B2 | 11/2008 | Welenson et al. | |
| 7,468,952 B2 | 12/2008 | Takeda et al. | |
| D586,358 S | 2/2009 | Blencowe | |
| 9,398,619 B1 * | 7/2016 | Sennett | H04W 4/90 |
| 2002/0090985 A1 * | 7/2002 | Tochner et al. | 463/1 |
| 2004/0225681 A1 * | 11/2004 | Chaney et al. | 707/104.1 |
| 2007/0133756 A1 * | 6/2007 | Graves, III | G06Q 10/109 379/37 |
| 2007/0234362 A1 | 10/2007 | Reohr, III | |
| 2008/0101456 A1 * | 5/2008 | Ridge et al. | 375/240.01 |
| 2008/0104018 A1 * | 5/2008 | Xia | 707/3 |
| 2008/0126476 A1 * | 5/2008 | Nicholas et al. | 709/203 |
| 2008/0201321 A1 | 8/2008 | Fitzpatrick et al. | |
| 2008/0262910 A1 | 10/2008 | Altberg et al. | |
| 2009/0012868 A1 * | 1/2009 | DeAngelis | 705/14 |
| 2009/0170532 A1 * | 7/2009 | Lee et al. | 455/456.3 |
| 2009/0216642 A1 * | 8/2009 | Ho | G06Q 30/02 705/14.25 |

(Continued)

OTHER PUBLICATIONS

Jain, S. et al., "Towards Standards for Integrated Gaming and Simulation for Incident Management," Proceedings of the 2007 Summer Computer Simulation Conference, San Diego, California, pp. 1213-1222.

*Primary Examiner* — Doon Y Chow
*Assistant Examiner* — Le V Nguyen
(74) *Attorney, Agent, or Firm* — William H. Hartwell; Hunter E. Webb; Keohane & D'Alessandro PLLC

(57) ABSTRACT

The present invention provides various approaches for disseminating emergency broadcasting messages or other messages of importance (hereinafter "alerts") within virtual world environments such that interested virtual world residents can be made aware of matters of importance based on their physical world locations (e.g., without respect to the locale of their current virtual world presence).

25 Claims, 9 Drawing Sheets

(56) References Cited

U.S. PATENT DOCUMENTS

| | | | |
|---|---|---|---|
| 2009/0281856 A1* | 11/2009 | Meyer et al. | 705/7 |
| 2010/0017283 A1* | 1/2010 | Hamilton et al. | 705/14.25 |
| 2010/0211431 A1* | 8/2010 | Lutnick et al. | 705/10 |
| 2011/0034183 A1* | 2/2011 | Haag | G06Q 50/26 455/456.3 |
| 2011/0086711 A1* | 4/2011 | Dunko et al. | 463/41 |

* cited by examiner

US 10,248,932 B2

INFORMING USERS OF A VIRTUAL UNIVERSE OF REAL WORLD EVENTS

FIELD OF THE INVENTION

This invention relates generally to virtual universes and more specifically to informing users of a virtual universe of real world events.

BACKGROUND OF THE INVENTION

Virtual universes (VUs) or virtual worlds, are computer-based simulated environments intended for its users or residents to inhabit and interact via avatars, which are personas or representations of the users of the virtual universes. VUs are also known as metaverses or "3D Internet". These types of virtual universes are now most common in multiplayer online games, such as Second Life®, which is a trademark of Linden Research Inc. in the United States. Avatars in these types of virtual universes, which can number well over a million, have a wide range of business and social experiences.

As virtual universes and other immersive 3-dimensional virtual environments substantially increase in popularity and participation, the need arises to treat such environments with the same due diligence as those previously established, such as radio and television. In particular, it has been established that as a means of effectively, rapidly, and inexpensively propagating a message of importance to a large part of a select population, such popular media plays a critical part. With the popularization and immersive nature of virtual world environments, it thus becomes necessary to employ similar tools, mechanisms, and due diligence to these environments that are likely to become the standard entertainment and/or work mediums for future generations, just as radio and television are pervasive for the current generation.

SUMMARY OF THE INVENTION

The present invention provides various approaches for disseminating emergency broadcasting messages or other messages of importance (hereinafter "alerts") within virtual world environments such that interested virtual world residents can be made aware of matters of importance based on their physical world locations (e.g., without respect to the locale of their current virtual world presence).

A first aspect of the present invention provides a method for informing users of a virtual universe (VU) of real world events, comprising: receiving an alert in the VU, the alert pertaining to a real world event; identifying a set of VU users to which the alert pertains based on a real world location of the set of VU users; and informing the set of VU users of the alert using the VU.

A second aspect of the present invention provides a computer system for informing users of a virtual universe (VU) of real world events, comprising: at least one processing unit; memory operably associated with the at least one processing unit; and a utility stored in the memory and executable by the at least one processing unit, the utility comprising: a module for receiving an alert in the VU, the alert pertaining to a real world event; a module for identifying a set of VU users to which the alert pertains based on a real world location of the set of VU users; and a module for informing the set of VU users of the alert using the VU.

A third aspect of the present invention provides a computer readable medium containing a program product for informing users of a virtual universe (VU) of real world events, the computer readable medium comprising: a program code for causing a computer to: receive an alert in the VU, the alert pertaining to a real world event; identify a set of VU users to which the alert pertains based on a real world location of the set of VU users; and inform the set of VU users of the alert using the VU.

A fourth aspect of the present invention provides a method for deploying a system for informing users of a virtual universe (VU) of real world events, comprising: deploying a computer infrastructure being operable to: receive an alert in the VU, the alert pertaining to a real world event; identify a set of VU users to which the alert pertains based on a real world location of the set of VU users; and inform the set of VU users of the alert using the VU.

BRIEF DESCRIPTION OF THE DRAWINGS

These and other features of this invention will be more readily understood from the following detailed description of the various aspects of the invention taken in conjunction with the accompanying drawings in which.

Figure 1:
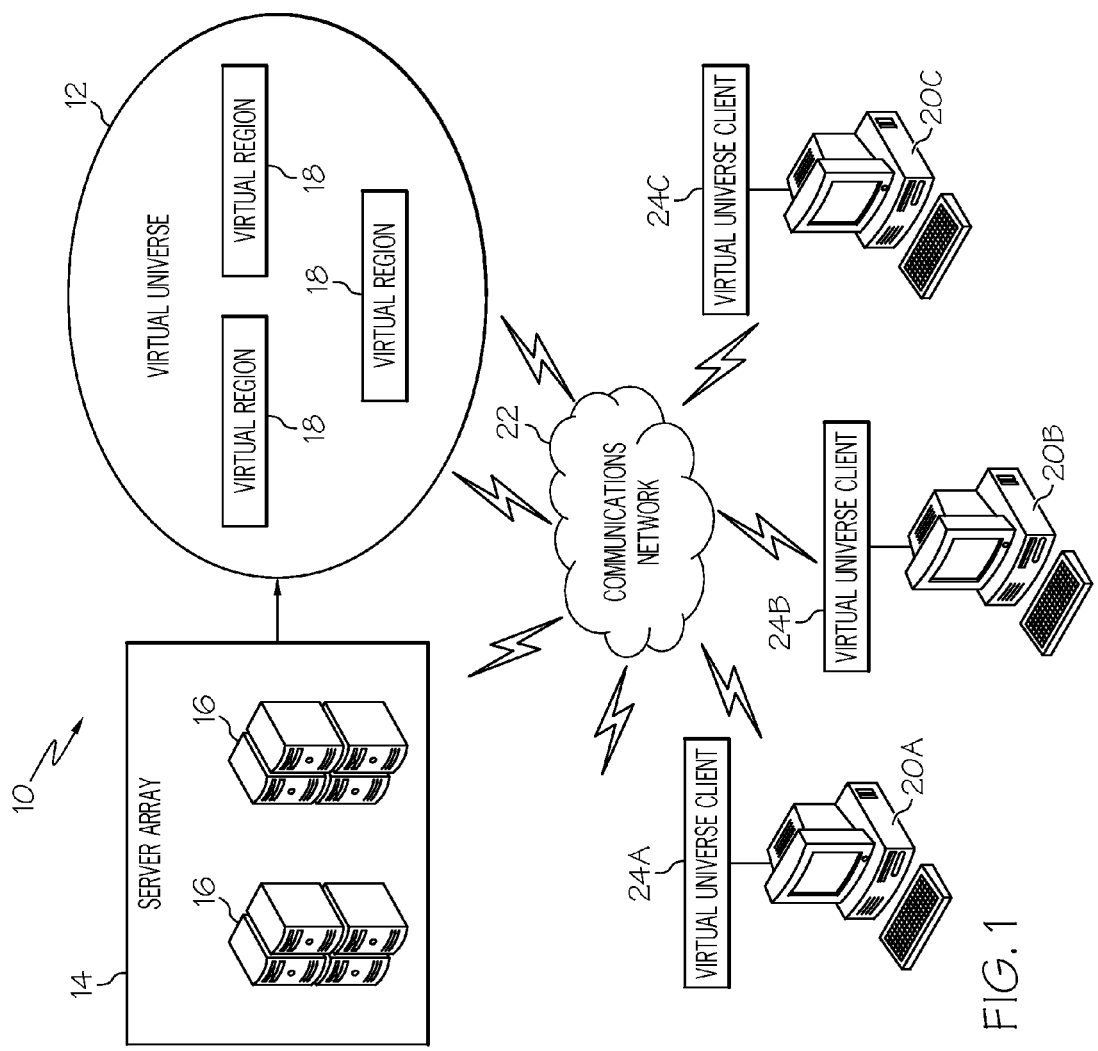
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For the purposes of this disclosure, the following terms have the associated meanings:
1. Virtual Universe (VU) or virtual world means any on-line social, business, and/or gaming environment.
2. An avatar is a graphical representation the user selects that others may see, often taking the form of a cartoon-like human.
3. An avatar in a virtual world is often referred to as a resident.
4. An agent is the user's account, upon which the user may build an avatar, and which is tied to the inventory of assets the user owns.

5. A region is a virtual area of land within the VU, typically residing on a single server.
6. An area is a specific place within a region such as a building or a room.
7. A login environment is the region and areas that are loaded by default when the avatar enters the virtual world.
8. Assets, avatars, the environment, and anything visual comprises UUIDs, unique identifiers tied to geometric data (distributed to users as textual coordinates), textures (distributed to users as graphics files such as JPEG2000 files), and effects data (rendered by the user's client according to the user's preferences and user's device capabilities).

The emergency broadcasting system has been in operation in the United States since the year 1963, and was updated and redeployed as the Emergency Alert System (EAS) in 1997. Since that time an explosion of Internet use has occurred in the United States and across the globe. Most recently, Internet technology has evolved to the point that immersive virtual environments such as Second Life® for social networking and business have become increasingly popular. An ever growing population of virtual residents can be found in these virtual environments at every moment of the day or night with hosting servers and VU participants in almost every country in the world. As such, this medium now provides the possibility of a world-wide "Event Communication System" (ECS), capable of broadcasting messages of import to VU residents across the globe. It should be understood in advance that although the example recited herein deals with informing virtual universe users of real world emergencies, any type of real world event could be accommodated (e.g., election results, sporting event results, etc.).

FIG. 1 shows a high-level schematic diagram showing a networking environment 10 for providing a virtual universe 12 according to one embodiment of this invention in which informing users of a virtual universe of real world events can be utilized. As shown in FIG. 1, networking environment 10 comprises a server array or grid 14 comprising a plurality of servers 16, each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16, within server array 14, shows up in virtual universe 12 as a virtual region 18 made up of objects, textures and scripts. Like the real world, each virtual region 18 within virtual universe 12 comprises a landscape having virtual content, such as buildings, stores, clubs, sporting arenas, parks, beaches, cities, and towns all created by administrators or residents of the universe that are represented by avatars. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred to generally as 20) interact with virtual universe 12 through a communication network 22 via virtual universe clients 24A-24C (hereinafter referred to generally as 24) that reside in computers 20, respectively. Below are further details of virtual universe 12, server array 14, and virtual universe client 24.

One of the ways that users of virtual universe 12 can use virtual universe client 24 to interact with the universe is to view advertising content within the virtual universe. An illustrative but non-limiting listing of advertisements that can be viewed through virtual universe client 24 includes items such as billboards, store window display, etc. As will be further described herein, embodiments of this invention are directed to facilitating the management of these advertisement assets in virtual universe 12.

Figure 2:
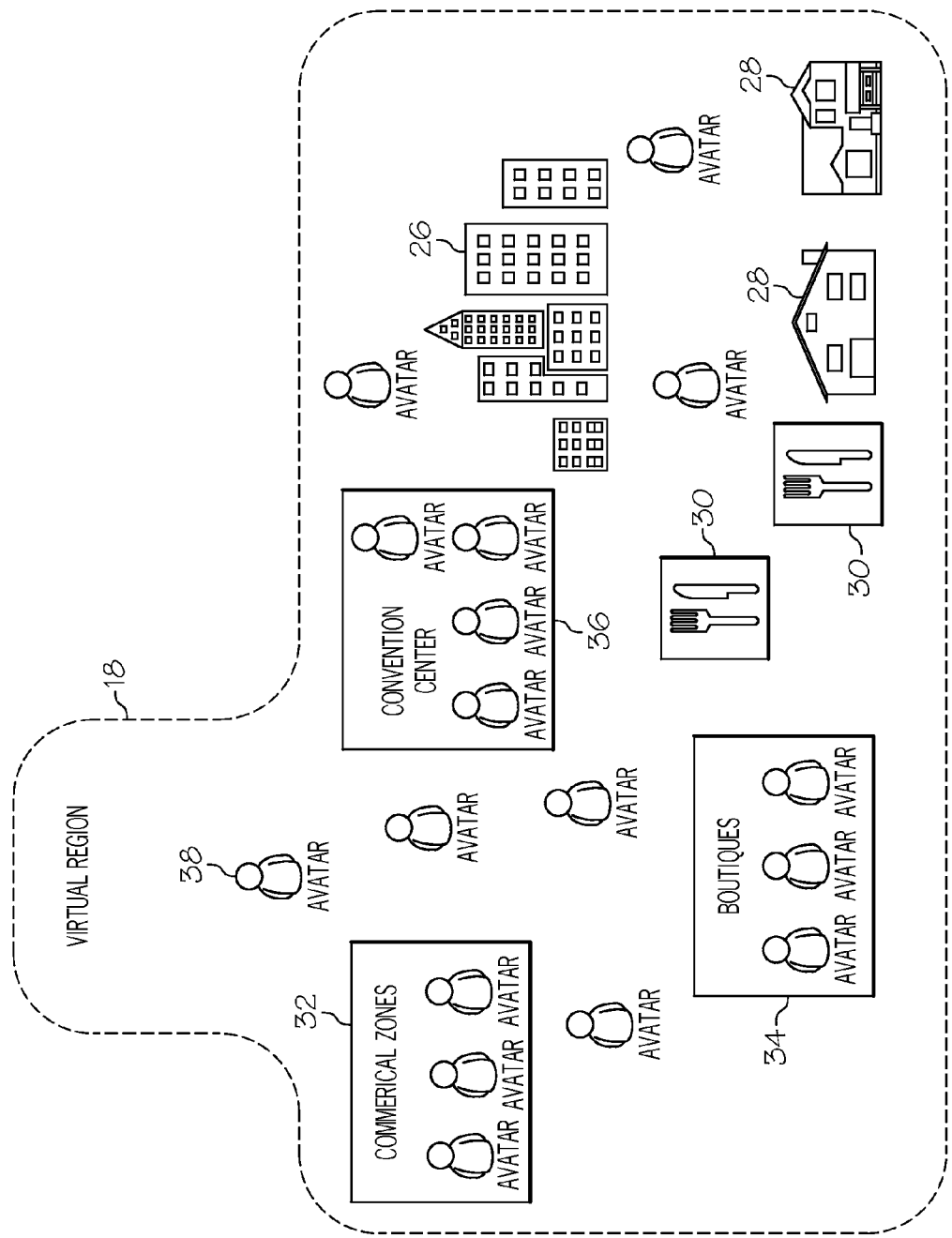
FIG. 2 shows a more detailed view of a virtual region shown in the virtual universe of FIG. 1.

FIG. 2 shows a more detailed view of what one virtual region 18 in virtual universe 12 may comprise. As an example, virtual region 18 shown in FIG. 2 comprises a downtown office center 26, homes 28, restaurants 30, a supermarket 32, a shopping mall 34 for shopping, and a convention center 36 for meetings and various conventions. Residents or avatars 38, which as mentioned above, are personas or representations of the users of the virtual universe, roam all about the virtual region by walking, driving, flying, or even by teleportation or transportation, which is essentially moving through space from one point to another, more or less instantaneously. These examples of virtual content in virtual region 18 shown in FIG. 2 are only illustrative of some items that may be found in a virtual region, and those skilled in the art will recognize that these regions can have many more items that can be found in the real world universe, as well as things that do not presently exist in the real world.

Figure 3:
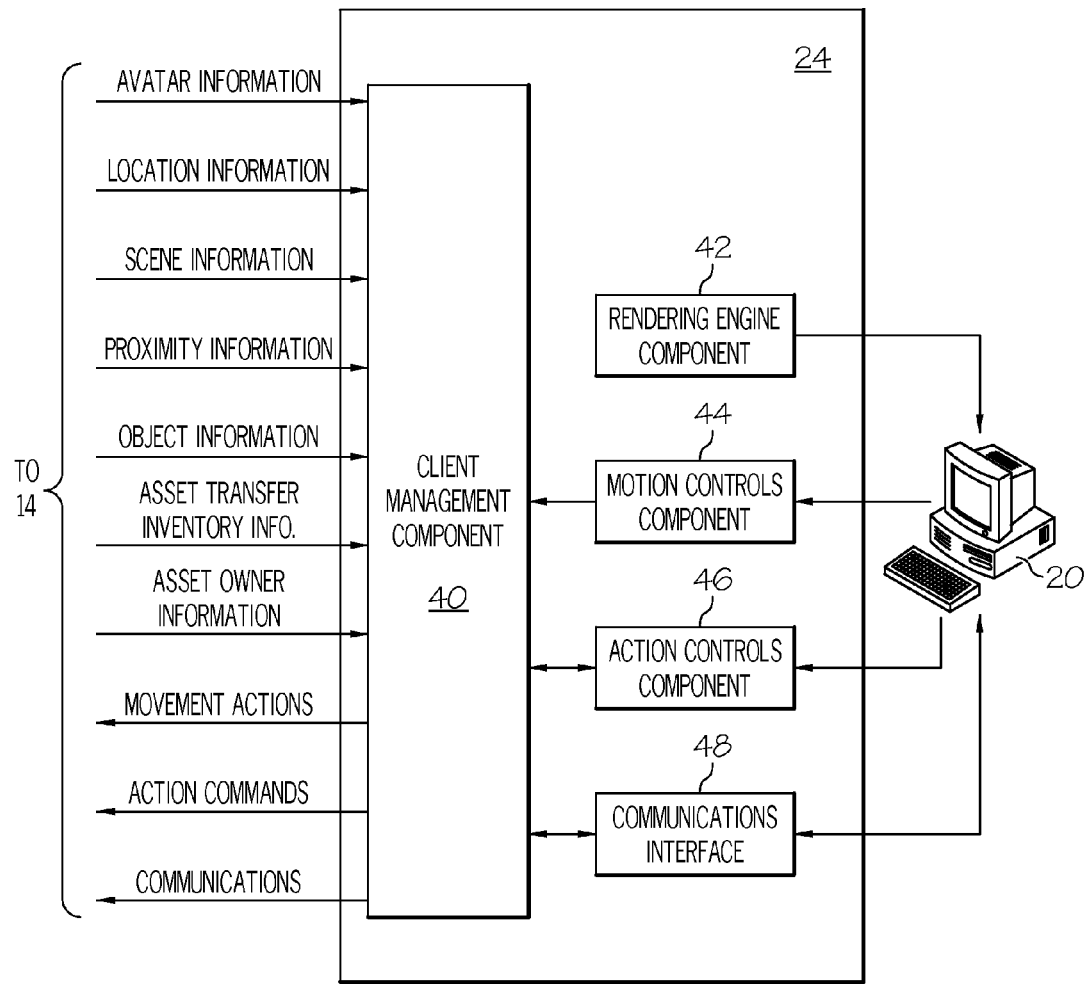
FIG. 3 shows a more detailed view of the virtual universe client shown in FIG. 1.

FIG. 3 shows a more detailed view of virtual universe client 24 shown in FIG. 1. Virtual universe client 24, which enables users to interact with virtual universe 12, comprises a client management component 40, which manages actions, commands, and communications made by a user through computer 20, and information received from the virtual universe through server array 14. A rendering engine component 42 enables the user of computer 20 to visualize his or her avatar within the surroundings of the particular region of virtual universe 12 where the avatar is presently located.

A motion controls component 44 enables the user's avatar to make movements through the virtual universe. In one embodiment, movements through the virtual universe can include, for example, gestures, postures, walking, running, driving, flying, etc. An action controls component 46 enables the user to perform actions in the virtual universe, such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of virtual universe 12 through modalities such as chatting, instant messaging, gesturing, talking, and electronic mail (e-mail).

FIG. 3 shows the various types of information received by client management component 40 from the virtual universe through the server array 14. In particular, client management component 40 receives avatar information about the avatars that are in proximity to the user's avatar. In addition, client management component 40 receives location information about the area that the user's avatar is near (e.g., what region or island he or she is in), as well as scene information (e.g., what the avatar sees). Client management component 40 also receives proximity information, which contains information on what the user's avatar is near, and object information, which is information about nearby objects. Client management component 40 receives avatar and location information, which information is utilized by the emergency broadcast utility 53. FIG. 3 also shows the movement commands and action commands that are generated by the user and sent to the server array via client management component 40, as well as the communications that can be sent to the users of other avatars within the virtual universe.

Figure 4:
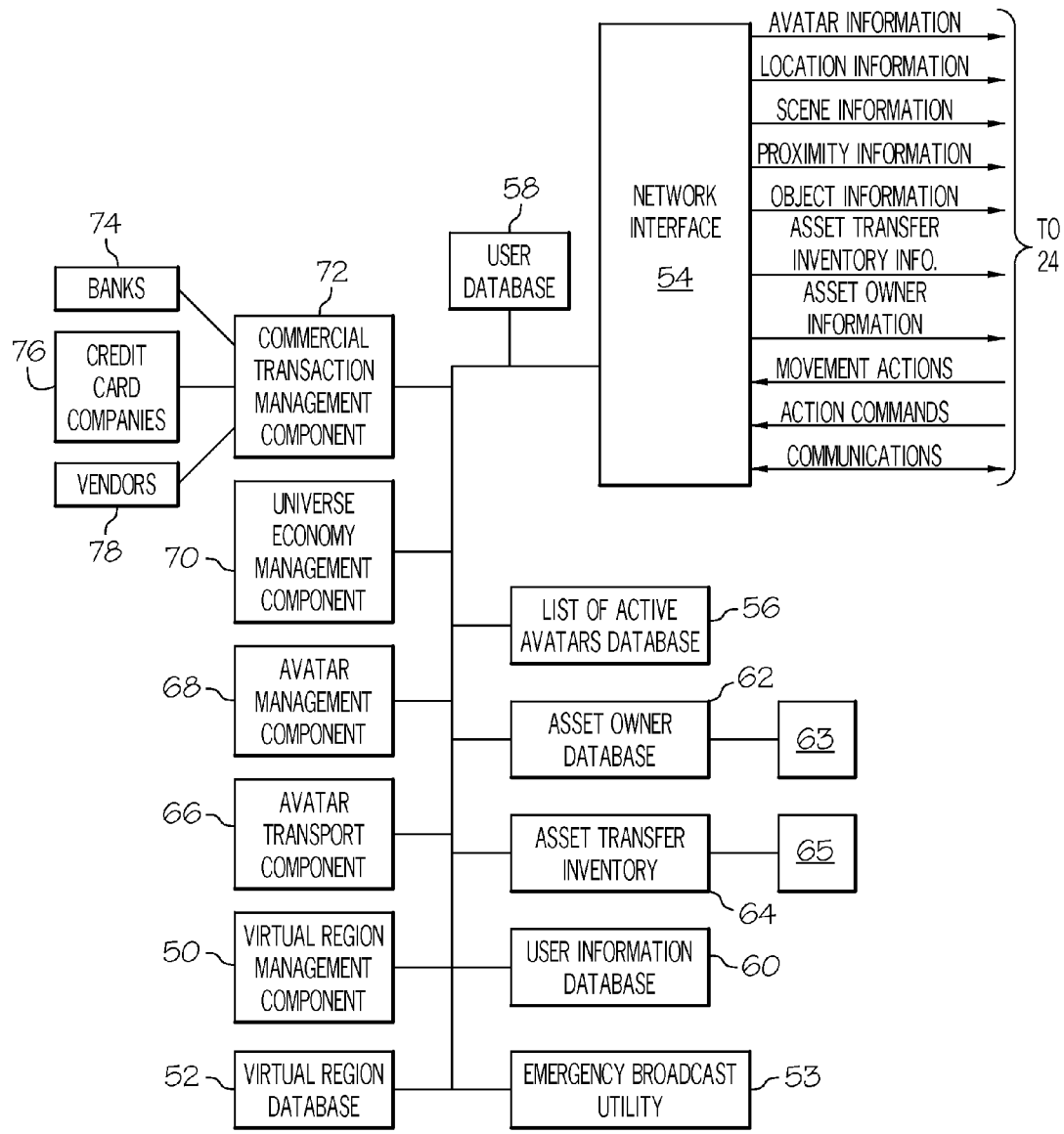
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region within the virtual universe. Virtual region management component 50 manages what happens in a particular region, such as the type of landscape in that region, the number of homes, commercial zones, boutiques, streets, parks, restaurants, etc. For example, virtual region management component 50 would allow the owner of a particular region or establishment within the region to specify requirements for entering or remaining within the region that could potentially affect certain avatar characteristics. Those skilled in the art will recognize that virtual region management component 50 can manage many other facets within the virtual region.

FIG. 4 also shows a network interface 54 that enables server array 14 to interact with virtual universe client 24 residing on computer 20. In particular, network interface 54 communicates active avatar, location, scene, proximity, script, object, asset transfer inventory, asset owner, user database, and user information to the user through virtual universe client 24. The network interface receives movement and action commands, as well as communications from the user via virtual universe client 24.

FIG. 4 also shows an emergency broadcast utility 53, which provides the capability to communicate alerts in the virtual universe based on real world locations of users, as will be further described below. In this embodiment, emergency broadcast utility 53 resides on the same computer system as server array 14, and communicates directly to virtual universe 12 and its users via virtual universe client 24. In other embodiments, emergency broadcast utility 53 might reside on the same computer as virtual universe client 24, have components that reside on both server array 14 and virtual universe client 24, or reside on separate computers in direct communication with virtual universe servers 16 and virtual universe clients 24.

As shown in FIG. 4, there are several different databases for storing information. In particular, virtual region database 52 stores information on all of the specifics in virtual region 18 that virtual region management component 50 is managing. Virtual region database 52 contains metadata information about the objects, texts, and scripts associated with the virtual content in the virtual region(s). Active avatars database 56 contains a list of all the avatars that are online in the virtual universe 12, while databases 58 and 60 contain information on the actual human users or avatars in the virtual universe 12. In one embodiment, user database 58 contains general information on the users such as names, email addresses, locales, interests, ages, preferences, etc., while user information database 60 contains information on the users such as billing information (e.g., credit card information) for taking part in transactions.

Databases 52, 56, 58, 60 and 63 contain information on the avatars of the users that reside in virtual universe 12. In one embodiment, virtual region database 52, list of active avatars database 56, user database 58, user information database 60, and asset owner database 63 are tracked for avatars within a multidimensional space of the virtual region 18. The information is typically in the form of metadata associated with the virtual content of each user's avatar(s). An illustrative but non-limiting list of avatar usage information includes appearance, asset inventory, past activities, and purchases. Those skilled in the art will recognize that this listing of avatar usage information is illustrative of possible items and is not exhaustive. For example, other user information may include name of the owner, e-mail address of the owner, the address of the originating computer, or any other type of user information.

Each user demographic may be associated with a piece of executable code or other data, called a script, which may affect rendering in some fashion during a session in the virtual universe. A clothing asset, for example, may be rendered with a script that causes the clothing to shimmer. A virtual pet, in another example, may render as an automated avatar that follows the user's avatar within the virtual universe.

Virtual region database 52, list of active avatars database 56, user database 58, user information database 60, and asset owner database 63 are databases that contain demographic information within emergency broadcast utility 53. In an exemplary embodiment, asset transfer inventory 64 comprises a listing table 65 having a foreign key to an asset table 63 within asset owner database 62, such that querying the asset transfer inventory 64 pulls information from asset table 63 to listing table 65. Those skilled in the art will recognize that other techniques for transferring data between databases 52, 56, 58, 60, and 63 are possible within the scope of the invention.

Those skilled in the art will also recognize that databases 52-63 may contain additional information if desired. Databases 52-63 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, virtual region database 52, list of active avatars database 56, user database 58, user information database 60, and asset owner database 63 might reside on the same computers as virtual universe client 24, have components that reside on both server array 14 and virtual universe client 24, or reside on separate computers in direct communication with virtual universe servers 16 and virtual universe client 24.

An avatar transport component 66 enables users to transport, which, as mentioned above, allows avatars to transport through space from one point to another point instantaneously. As a result, an avatar could, for example, travel from a business region to an entertainment region to experience a concert.

An avatar management component 68, keeps track of what the avatars are doing while in the virtual universe. For example, avatar management component 68 can track where each avatar is presently located in the virtual universe, as well as what activities it is performing, or has recently performed. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, virtual universe 12 will have its own VU currency ($VU) that users pay for with real life money. The users can then take part in commercial transactions for their avatars through universe economy management component 70. For example, an avatar might want to pay for a service that provides discovery and transfer of assets within the virtual universe. In this case, the avatar would make the purchase of this service using the $VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not the user's avatar. In order to fulfill this type of transaction and others similarly related, commercial transaction management component 72 interacts with banks 74, credit card companies 76 and vendors 78.

Figure 5:
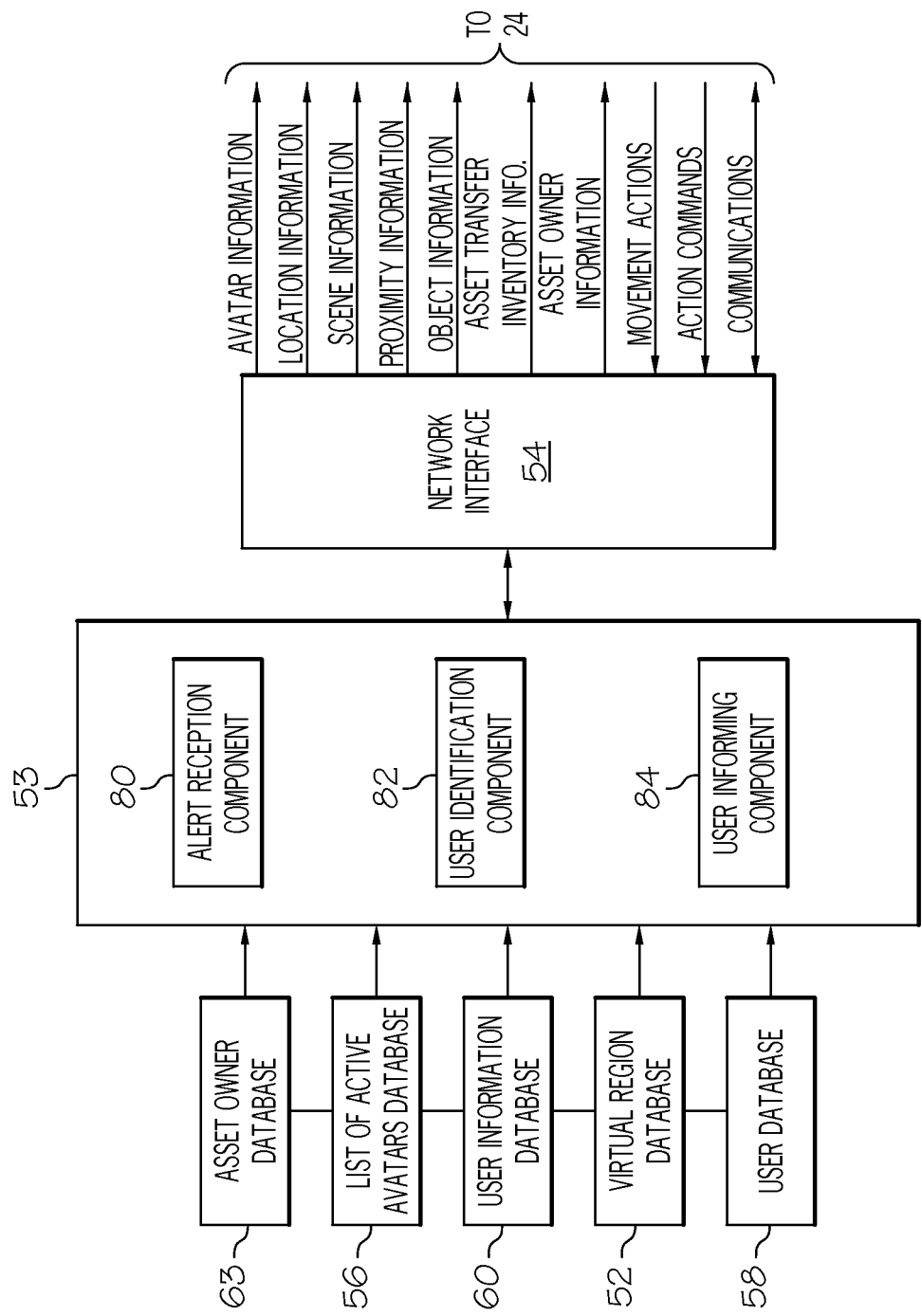
FIG. 5 shows an emergency broadcast utility according to one embodiment of this invention that operates in the environment shown in FIG. 1.

Referring now to FIG. 5, a more detailed view of emergency broadcast utility 53 is shown. In general, emergency broadcast utility 53 represents an API, plug-in, or the like, and comprises alert reception component 80, user identification component 82, and alert communication component 84. Collectively, these components allow for real world emergency broadcast alerts to be received, and for geographically appropriate users to be so informed.

Figure 6:
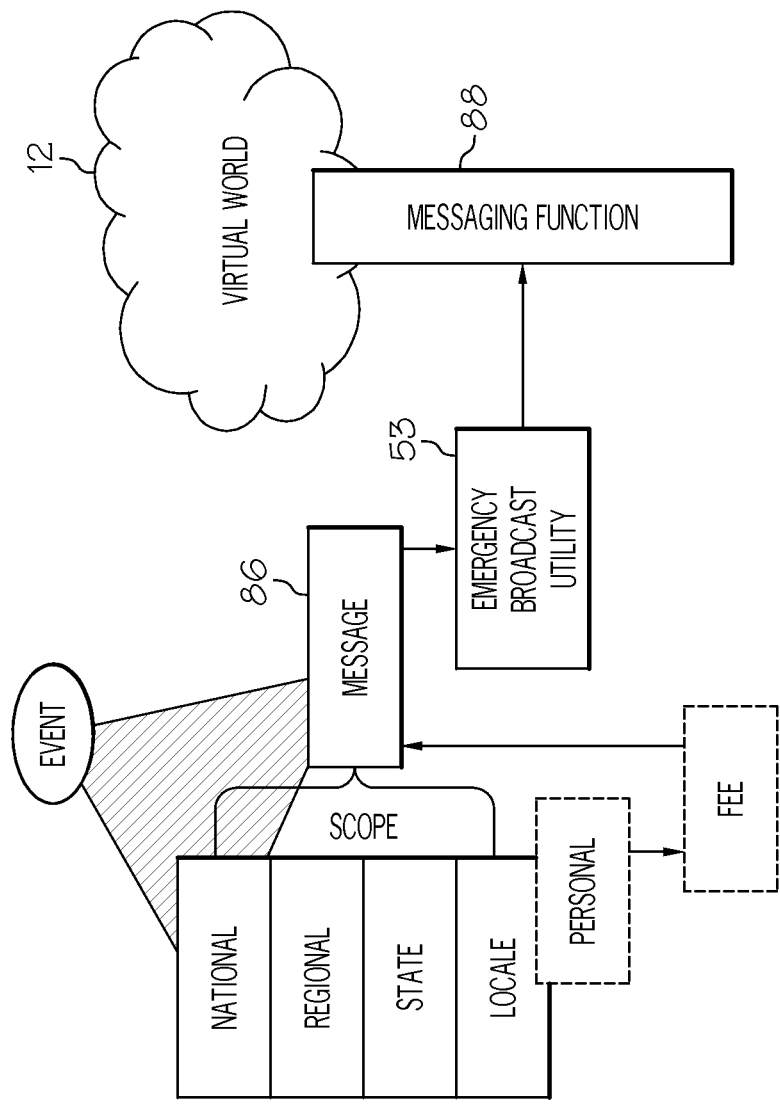
FIG. 6 shows a system for receiving real world alerts in a virtual universe environment according to one embodiment of the present invention.

Referring now to FIG. 6, these concepts will be further explained. As is depicted, the logic flow is initiated by the occurrence of an event that requires a message broadcast. Various location filters or identifiers may then be applied in order to reach the intended target/interested population. In preferred embodiments, the message is then passed through either an API or plug-in represented by emergency broadcast utility 53, and subsequently passed on to appropriate users (e.g., broadcast into the appropriate locations within the virtual universe environment).

Regardless, as depicted in FIG. 6, an alert/message 86 is generated pursuant to a real world event and then fed to alert reception component 80 (FIG. 5). Upon receipt, user identification component 82 will determine alert 86 emergency broadcast utility 53. Upon receipt, a set of VU users to which alert 86 pertains will be identified based on their real world locations (using demographic information). For example, if the alert pertained to an event in St. Paul, Minn., then only users having a real world location within a predetermined proximity to St. Paul, Minn. would be identified. Thus, the identification/selection of the set of users to be informed can be independent of their location in virtual universe 12. Once the set of users has been identified, user information component 84 will inform each of the set of users of alert 86 using the virtual universe 12. Under the present invention, this can be accomplished in any number of ways such as: sending a message to the set of users using a messaging system (e.g., email, messaging system associated with the virtual universe 12, etc.); displaying the alert in virtual universe 12, generating an audible alert using a set of client computers operated by the set of users; sending to the private emails of set of users; sending phone and/or text messages to the set of users; or any combination thereof. It should be understood that in configuring the virtual universe, each user could indicate a preference or preferences for being alerted of real world events. For example, a user could wish to be alerted first by a "posting" in the virtual universe, then if he/she fails to acknowledge the alert within a predetermined period of time, the user will be alerted via cell phone text message.

These concepts will now be explained in greater detail in conjunction with the high-level example shown in FIG. 7. As has been stated, preferred embodiments use an API 53A or application plug-in 53B (collectively represented by emergency broadcast utility 53) to feed the message into virtual universe 12. These processes are very similar, where use of an API typically denotes that a governing standard is in place such that a message, from the existing EAS for example, could be loaded using the message specification and format understood by the API 53A, and where use of a plug-in 53B does not necessarily indicate that a governing standard does, or does not, exist, and any special handling and formatting of the message occurs within the plug-in such that the resultant message is readable by the receiving messaging function 88 within virtual universe 12. Messages passed using a plug-in 53B may be variable in nature and may come from differing and desperate sources such as Internet web pages, databases, catalogs, and the like. It should be noted that in another embodiment, no plug-in 53B, API 53A, or other message passing function is required, and the message is directly input by an administrator into virtual universe 12 messaging function.

Figure 7:
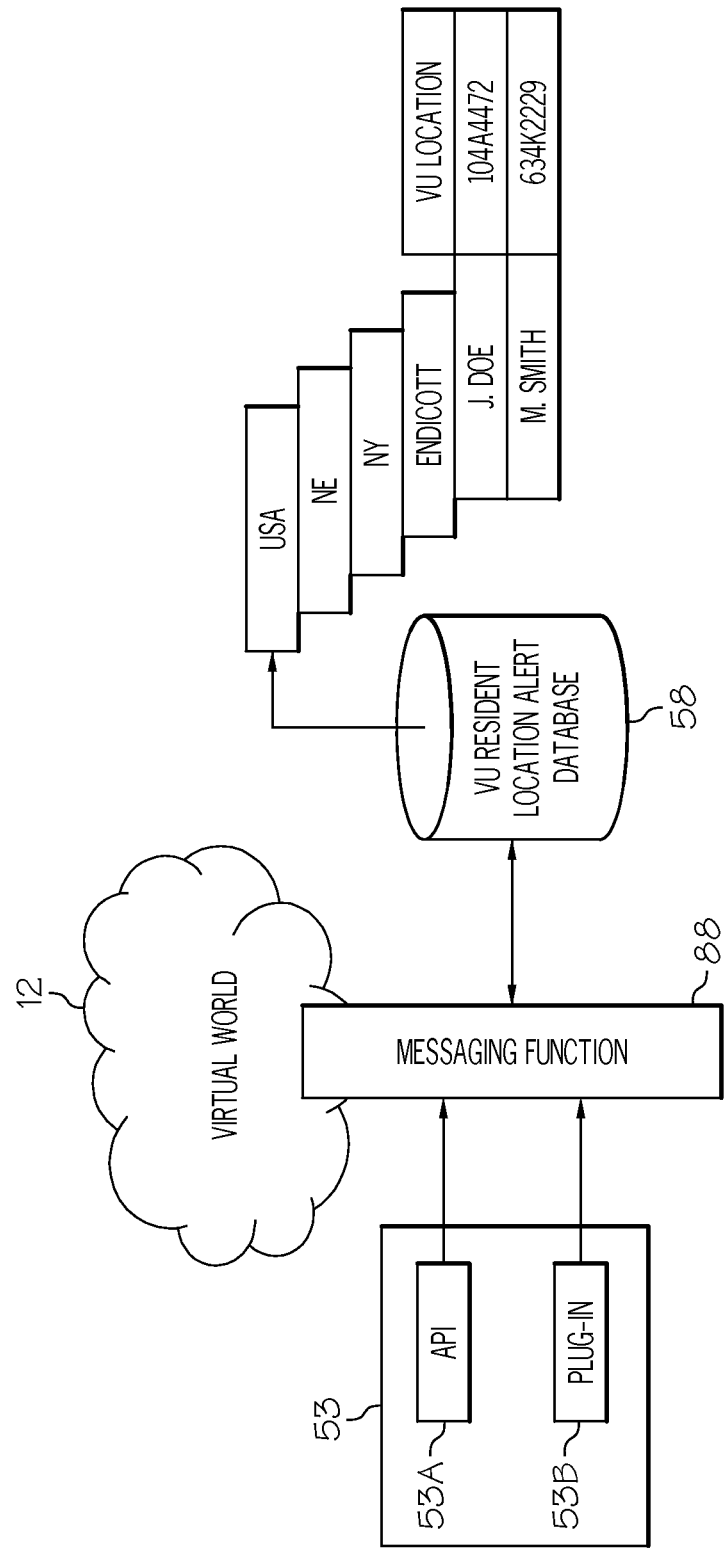
FIG. 7 shows a system for disseminating real world alerts to appropriate VU users according to one embodiment of the present invention.

In a preferred embodiment of the present invention, a key element of the messaging function would be a virtual universe 12 resident location database 58 (which could be any database shown in FIG. 4 such as user database 58) as depicted in FIG. 7. It is desirable to use a relational database (RDB) for this function due to the ease of data relationship mapping and the wide array of available data access and management tools. Such a database, database tables, database row and columns, and the like, may be stored in an existing RDB or RDB instance, may be a separate and independent RDB, or may be a combination of both (data federation). In other embodiments, non-database data storage methods may be used.

Once again referring to FIG. 7, and the preferred embodiment, upon a user (resident) login to virtual universe 12, hierarchical data is added to the location database such that residents are categorized by their real world physical locations. In this example, residents J. Doe and M. Smith are stored in the database following the path of USA→North East→New York→Endicott. Using this storage technique, an appropriate population of residents can be rapidly identified, where members of each lower data level are by default members of higher levels. As an example, a local emergency message would go to J. Doe and M. Smith in the event of a requirement existing only in Endicott. However, the same two users would also be included in any higher level message, such as a regional emergency message affecting the entire Northeast.

Real world location data used to classify the resident in the location database can be attained from profile data supplied by the user when registering an avatar, or from other real time detection techniques. In a preferred embodiment, a confirmation function using information such as the know origin of the avatar's current IP address, would be used to validate the resident's current physical world location prior to creating an entry in the database. In a preferred embodiment, if a discrepancy is detected, the user is prompted to validate or manually enter their current real world location.

In varying embodiments, the resident name used to track and/or broadcast to the resident may be the current login avatar name, the real name of the user, the UUID, or the like. Additionally, real time avatar location data, such as a set of virtual universe 12 coordinates representing the specific current location of the avatar within virtual universe 12, are stored in association with the specific user name. Continuing this example, a message intended to reach residents with the physical world location of Endicott, N.Y. would be broadcast in virtual universe 12 locations 104A4472 and 634K2229, the current locations of the two matching users. In a preferred embodiment, a feedback function would exist within this system such that the message for J. Doe and M. Smith would continue to periodically broadcast in their respective real time virtual universe 12 locations until acknowledged, or until the resident is no longer logged in to virtual universe 12. Additionally, such messages may be broadcast in various methods such as a globally visible sign with bold red text, otherwise highlighted locational text (visible to all in proximity), and private text (whisper function), for example.

In another embodiment, the user may be accessing the virtual world using a portable device and may not be in a fixed location. In this embodiment, physical location of the user would be determined using location features of the pervasive device such as GPS, cellular triangulation, and the like.

Such a system would also allow a resident to specify an alternate alert method for use while active within virtual universe 12, in a user profile for example. This data would also be associated with the user name stored in the database, and, in this case, if the user J. Doe specified a cellular phone, and user M. Smith specified an RF pager, the emergency message would also be broadcast to these devices.

In another embodiment, personal emergency messages could be transmitted to virtual universe 12 residents (similar to a telephone operator interrupting a phone call with an emergency message) such that with appropriate identifying data, a message can be broadcast to an individual virtual universe 12 resident. This system would be very helpful for situations where an individual desiring delivery of an emergency message is aware of the target individual's participation in a specific virtual universe 12 environment, but does not know the avatar name and thus has no means of making contact. The database, or combination of databases, would contain sufficient data to identify and broadcast a message to such a resident. This aspect of the system would likely be fee based in order to avoid abuse of the system.

Figure 8:
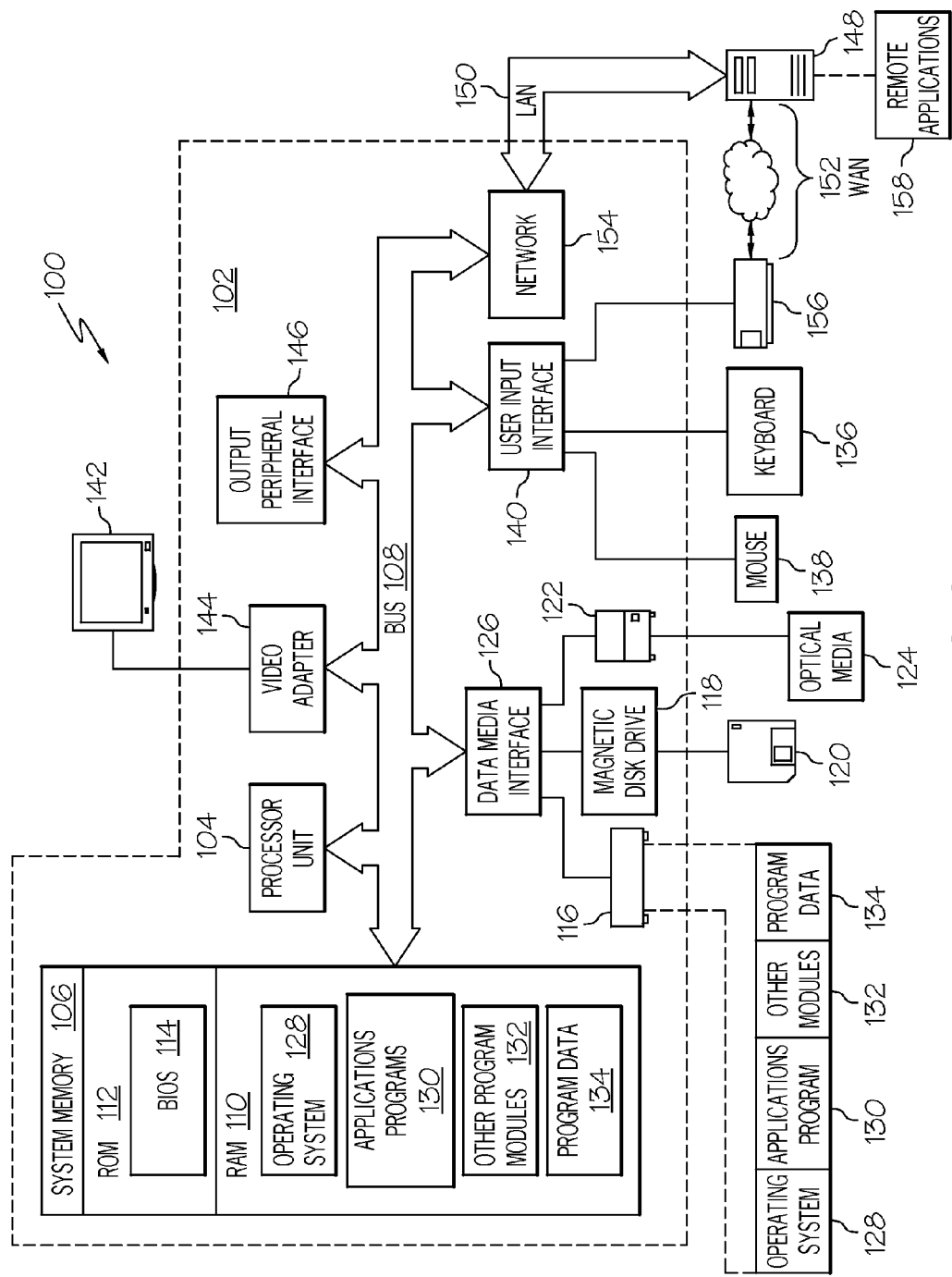
FIG. 8 shows a schematic of an exemplary computing environment in which elements of the networking environment shown in FIG. 1 may operate.

FIG. 8 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the invention described herein. Neither should computing environment 100 be interpreted as having any dependency or requirement relating to any one or combination of components illustrated in FIG. 8.

In the computing environment 100, there is a computer 102, which is operational with numerous other general purpose or special purpose computing system environments or configurations. Examples of well-known computing systems, environments, and/or configurations that may be suitable for use with computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on that perform particular tasks or implement particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 8, computer 102 in the computing environment 100 is shown in the form of a general purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 8, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM, or other optical media. Hard disk drive 116, magnetic disk drive 118, and optical disk drive 122 are each connected to bus 108 by one or more data media interfaces 126.

The drives and their associated computer-readable media provides non-volatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example and not limitation, an operating system 128, one or more application programs 130, other program modules 132, and program data 134. Each of the operating system 128, one or more application programs 130, other program modules 132, and program data 134, or some combination thereof, may include an implementation of the networking environment 10 of FIG. 1 including server array 14 and virtual universe client 24. In one embodiment, the one or more application programs 130 include components of emergency broadcast utility 53, such as multidimensional grid component 80, tracking avatar component 82, monitoring and deriving component 84, and displaying component 86.

Figure 9:
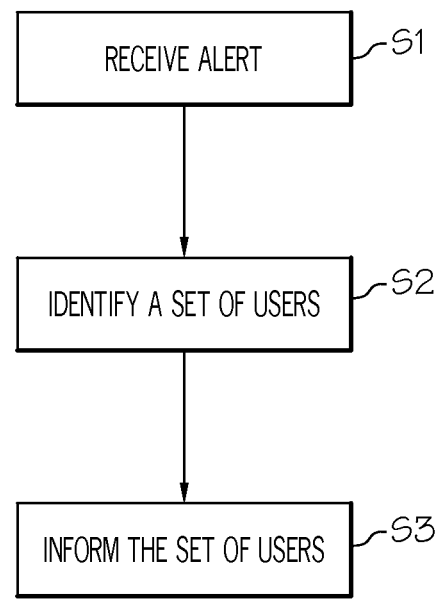
FIG. 9 shows a flow diagram of a method according to one embodiment of the invention.

The one or more program modules 130 carry out the methodologies disclosed herein, as shown in FIG. 9. According to one embodiment, in step S1, an alert pertaining to a real world event is received. In step S2, a set of users is identified based on its real world locations. In step S3, the set of users is informed of the alert using the virtual universe.

The flowchart of FIG. 9 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 8, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 8 include local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

In another embodiment, the invention provides a business method that performs the process of the invention on a subscription, advertising, and/or fee basis. That is, a service provider, such as a Solution Integrator, could offer to provide the functionality discussed herein. In this case, the service provider can create, maintain, support, etc., a computer infrastructure, such as computer infrastructure 102 (FIG. 8) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method for performing the functionality discussed herein. In this case, a computer infrastructure, such as computer infrastructure 102 (FIG. 8), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as processor unit 104 (FIG. 6), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

It is apparent that there has been provided with this invention a method for informing users of a virtual universe of real world events. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for informing users of a virtual universe (VU) of real world events, comprising:
   receiving, from a real-world emergency notification service, an alert at a VU server hosting the VU, the alert notifying of an emergency event that is currently occurring in a real world emergency location, the VU including a computer-based virtual environment that a plurality of users access, the plurality of users interacting with the computer-based virtual environment and with others of the plurality of users within the computer-based virtual environment using avatars;
   adding hierarchical data to a location database having, for every user of the plurality of users, a real world location associated with the user, the hierarchical data associating the user into a plurality of location-based categories;
   identifying, in response to receipt of the alert, a plurality of VU users to which the alert pertains based on a comparison of the real world emergency location and the real world location in the hierarchical data;
   validating, in response to the receipt of the alert, that the real world location in the hierarchical data of each VU user of the plurality of VU users to which the alert pertains is an actual current location of the VU user in real time using an internet protocol (IP) address associated with each of the plurality of VU users to which the alert pertains,
   informing all of the plurality of VU users that have been identified and currently have avatars that are online in the VU of the alert of the real-world emergency, including:
      providing a first in-VU indicated preferred alert having a first alert type designated by an online VU user of the plurality of VU users that have been identified and given within the virtual environment of the VU, wherein the first alert type is a private message visible only to the online VU user;
      and providing, in response to a determination that the online VU user has not responded to the first in-VU indicated preferred alert, a second in-VU indicated preferred alert having a first alert type designated by the online VU user, wherein the second alert type is a globally visible sign.

2. The method of claim 1, the identifying comprising determining a plurality of VU users having a real world location within a predetermined distance from a geographic area to which the alert pertains.

3. The method of claim 1, the plurality of VU users being identified based on demographic information.

4. The method of claim 1, the real world event being an emergency.

5. The method of claim 1, the informing comprising sending a message to the plurality of VU users using a messaging system, wherein the message is at least one of: an email, a phone call, a phone text, an audible alert, and an VU notification.

6. The method of claim 5, the messaging system being a messaging system associated with the VU.

7. The method of claim 1, the informing comprising displaying the alert for the plurality of VU users in the VU.

8. The method of claim 1, the informing comprising generating an audible alert using a set of client computers operated by the plurality of VU users.

9. A computer system for informing users of a virtual universe (VU) of real world events, comprising:
   at least one processing unit;
   memory operably associated with the at least one processing unit; and
   a utility stored in the memory and executable by the at least one processing unit, the utility performing a method comprising:
      receiving, from a real-world emergency notification service, an alert at a VU server hosting the VU, the alert notifying of an emergency event that is currently occurring in a real world emergency location, the VU including a computer-based virtual environment that a plurality of users access, the plurality of users interacting with the computer-based virtual environment and with others of the plurality of users within the computer-based virtual environment using avatars;
      adding hierarchical data to a location database having, for every user of the plurality of users, a real world location associated with the user, the hierarchical data associating the user into a plurality of location-based categories;
      identifying, in response to receipt of the alert, a plurality of VU users to which the alert pertains based on a comparison of the real world emergency location and the real world location in the hierarchical data;
      validating, in response to the receipt of the alert, that the real world location in the hierarchical data of each VU user of the plurality of VU users to which the alert pertains is an actual current location of the VU user in real time using an internet protocol (IP) address associated with each of the plurality of VU users to which the alert pertains, informing all of the plurality of VU users that have been identified and currently have avatars that are online in the VU of the alert of the real-world emergency, including:
    providing a first in-VU indicated preferred alert having a first alert type designated by an online VU user of the plurality of VU users that have been identified and given within the virtual environment of the VU, wherein the first alert type is a private message visible only to the online VU user;
    and providing, in response to a determination that the online VU user has not responded to the first in-VU indicated preferred alert, a second in-VU indicated preferred alert having a first alert type designated by the online VU user, wherein the second alert type is a globally visible sign.

10. The computer system of claim 9, the module for identifying being configured to determine a plurality of VU users having a real world location within a predetermined distance from a geographic area to which the alert pertains.

11. The computer system of claim 9, the plurality set of VU users being identified based on demographic information.

12. The computer system of claim 9, the real world event being an emergency.

13. The computer system of claim 9, the module for informing being configured to send a message to the plurality of VU users using a messaging system, wherein the message is at least one of: an email, a phone call, a phone text, an audible alert, and an VU notification.

14. The computer system of claim 13, the messaging system being a messaging system associated with the VU.

15. The computer system of claim 9, the module for informing being configured to inform comprising displaying the alert for the plurality of VU users in the VU.

16. The computer system of claim 9, the informing comprising generating an audible alert using a set of client computers operated by the plurality of VU users.

17. A computer readable storage device that is not a signal containing a program product for informing users of a virtual universe (VU) of real world events, the computer readable storage device that is not a signal comprising program code for causing a computer to:
    receive, from a real-world emergency notification service, an alert m at a VU server hosting the VU, the alert notifying of a real world an emergency event that is currently occurring in a real world emergency location, the VU including a computer-based virtual environment that a plurality of users access, the plurality of users interacting with the computer-based virtual environment and with others of the plurality of users within the computer-based virtual environment using avatars;
    add hierarchical data to a location database having, for every user of the plurality of users, a real world location associated with the user, the hierarchical data associating the user into a plurality of location-based categories;
    identify, in response to receipt of the alert, a plurality of VU users to which the alert pertains based on a comparison of the real world emergency location and the real world location in the hierarchical data;
    validate, in response to the receipt of the alert, that the real world location in the hierarchical data of each VU user of the plurality of VU users to which the alert pertains is an actual current location of the YU user in real time using an internet protocol (IP) address associated with each of the plurality of VU users to which the alert pertains,
    inform all of the plurality of VU users that have been identified and currently have avatars that are online in the VU of the alert of the real-world emergency, including:
        providing a first in-VU indicated preferred alert having a first alert type designated by an online VU user of the plurality of VU users that have been identified and given within the virtual environment of the VU, wherein the first alert type is a private message visible only to the online VU user;
        and providing, in response to a determination that the online VU user has not responded to the first in-VU indicated preferred alert, a second in-VU indicated preferred alert having a first alert type designated by the online VU user, wherein the second alert type is a globally visible sign.

18. The computer readable storage device that is not a signal containing the program product of claim 17, the computer readable medium further comprising program code for causing the computer to determine a plurality of VU users having a real world location within a predetermined distance from a geographic area to which the alert pertains.

19. The computer readable storage device that is not a signal containing the program product of claim 17, the plurality of VU users being identified based on demographic information.

20. The computer readable storage device that is not a signal containing the program product of claim 17, the real world event being an emergency.

21. The computer readable storage device that is not a signal containing the program product of claim 17, the computer readable medium further comprising program code for causing the computer to send a message to the plurality of VU users using a messaging system, wherein the message is at least one of: an email, a phone call, a phone text, an audible alert, and an VU notification.

22. The computer readable storage device that is not a signal containing the program product of claim 21, the messaging system being a messaging system associated with the VU.

23. The computer readable storage device that is not a signal containing the program product of claim 17, the computer readable medium further comprising program code for causing the computer to display the alert for the plurality of VU users in the VU.

24. The computer readable storage device that is not a signal containing the program product of claim 17, the computer readable medium further comprising program code for causing the computer to generate an audible alert using a set of client computers operated by the plurality of VU users.

25. A method for deploying a system for informing users of a virtual universe (VU) of real world events, comprising:
    deploying a computer infrastructure being operable to:
        receive, from a real-world emergency notification service, an alert at a VU server hosting the VU, the alert notifying of an emergency event that is currently occurring in a real world emergency location, the VU including a computer-based virtual environment that a plurality of users access, the plurality of users interacting with the computer-based virtual environment and with others of the plurality of users within the computer-based virtual environment using avatars;

add hierarchical data to a location database having, for every user of the plurality of users, a real world location associated with the user, the hierarchical data associating the user into a plurality of location-based categories;

identify, in response to receipt of the alert, a plurality of VU users to which the alert pertains based on a comparison of the real world emergency location and the real world location in the hierarchical data;

validate, in response to the receipt of the alert, that the real world location in the hierarchical data of each VU user of the plurality of VU users to which the alert pertains is an actual current location of the VU user in real time using an internet protocol (IP) address associated with each of the plurality of VU users to which the alert pertains, inform all of the plurality of VU users that have been identified and currently have avatars that are online in the VU of the alert of the real-world emergency, including:

providing a first in-VU indicated preferred alert having a first alert type designated by an online VU user of the plurality of VU users that have been identified and given within the virtual environment of the VU, wherein the first alert type is a private message visible only to the online VU user;

and providing, in response to a determination that the online VU user has not responded to the first in-VU indicated preferred alert, a second in-VU indicated preferred alert having a first alert type designated by the online VU user, wherein the second alert type is a globally visible sign.

* * * * *